United States Patent [19]

Hulsey

[11] 4,212,321

[45] Jul. 15, 1980

[54] LOW NOISE ROTARY CONTROL VALVE

[75] Inventor: Eldon E. Hulsey, 4111 Woodhead, #45, Houston, Tex. 77098

[73] Assignees: J. R. Butler; Eldon S. Hulsey; Joe Hulsey; Pipe Line Tech., Inc., all of Houston, Tex.

[21] Appl. No.: 27,967

[22] Filed: Apr. 9, 1979

Related U.S. Application Data

[63] Continuation-in-part of Ser. No. 820,190, Jul. 29, 1977, abandoned.

[51] Int. Cl.² ............................................. F16K 47/04
[52] U.S. Cl. ............................... 137/625.32; 251/127; 251/209
[58] Field of Search ...................... 137/625.32, 625.31; 251/127, 207, 209; 181/258

[56] References Cited

U.S. PATENT DOCUMENTS

| | | | |
|---|---|---|---|
| 3,443,793 | 5/1969 | Hulsey | 251/209 |
| 3,826,281 | 7/1974 | Clark | 137/625.31 |

FOREIGN PATENT DOCUMENTS

| | | | |
|---|---|---|---|
| 2352370 | 4/1975 | Fed. Rep. of Germany | 137/625.32 |
| 237241 | 8/1945 | Switzerland | 251/209 |
| 722570 | 1/1955 | United Kingdom | 137/625.32 |

*Primary Examiner*—Arnold Rosenthal
*Attorney, Agent, or Firm*—Michael P. Breston

[57] ABSTRACT

The valve comprises a casing which defines a receptacle having a main axis. The receptacle has a pair of opposed ports forming a flowway having an axis disposed at an acute angle to the main axis. A flow-control element is rotatably disposed within the receptacle. The element has an axis of rotation coaxial with the main axis. The body of the control element defines an axial open bore. The bore is in register with the flow ports at the fully-open position of the control element. A pair of elongated orifice slots extend circumferentially through the wall of the control element's body. At least one slot is defined by wall converging toward its trailing end. A chamber surrounds the walls of the axial bore in the control element's body. Silencing means in the body of the control element produce a silencing effect on the fluid flowing through the flowway only when the flowway is throttled by the orifice slots. The flow in the flowway is substantially unhindered when the ends of the bore are opposite to the flow ports in the casing.

15 Claims, 19 Drawing Figures

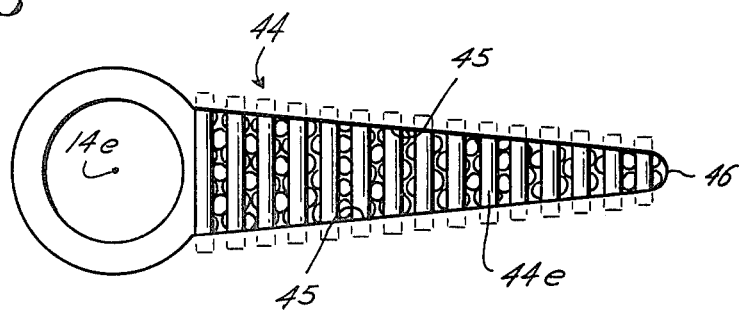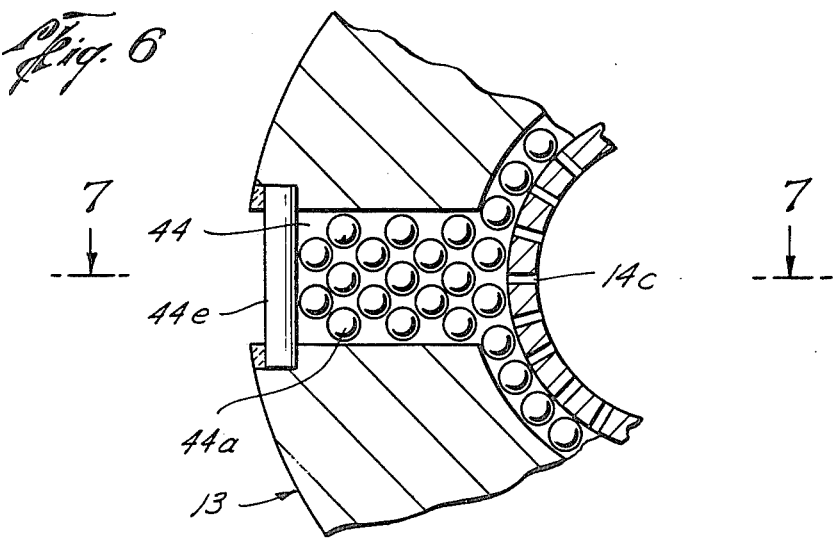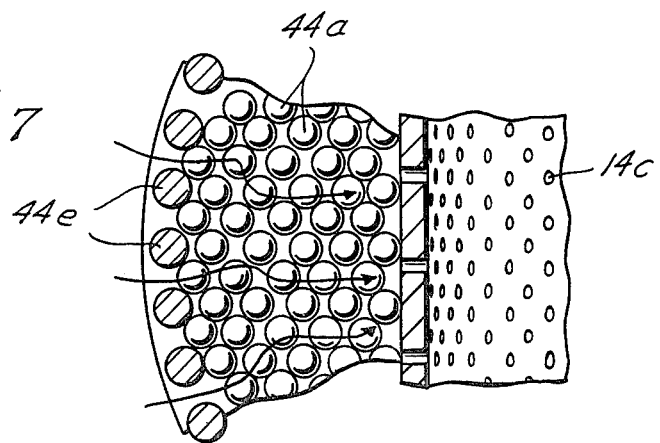

LOW NOISE ROTARY CONTROL VALVE

REFERENCE TO RELATED APPLICATION

This application is a continuation-in-part of copending application Ser. No. 820,190, filed on July 29, 1977, and now abandoned.

BACKGROUND OF THE INVENTION

In my U.S. Pat. Nos. 3,443,793, 3,558,100 and 3,612,102, I have described several valves with rotary-control elements which have unique advantages over conventional rotary-control valves. I have now discovered that my patented valves can be integrated with useful silencing means to produce new and unobvious results.

Control valves with noise-silencing means have been described in the patent literature, as well as in technical publications. Many such valves are commercially available. For example, patents showing valves with such silencing means include the following:

| | |
|---|---|
| 3,665,965 | 3,813,079 |
| 3,693,659 | 3,880,399 |
| 3,704,726 | 3,941,350 |
| 3,722,854 | 3,978,891 |
| 3,773,085 | 3,990,475 |
| 3,776,278 | |

The control valves with noise-silencing means, such as are known to me, however, have a common characteristic in that the silencing means are continuously and constantly in the path of the flowway through the valve and, therefore, continuously interfere with the flow of fluid, even when the valve is in its fully-opened position.

SUMMARY OF THE INVENTION

The rotary-control valve of this invention comprises a casing which defines a receptacle having a main axis. The receptacle has a pair of opposed flow ports which form a flowway. The axis of the flowway is disposed at an acute angle relative to the main axis. A flow-control element is rotatably disposed within the receptacle. The element's body is shaped to fit inside the receptacle and has an axis of rotation coaxial with the main axis of the casing. The control element's body has a bore and defines a cylindrical silencing chamber around the bore. A pair of elongated orifice slots extend circumferentially through the wall of the control element's body in opposite directions from the opposite ends of the bore. At least one slot is defined by walls converging toward its trailing end. The body also has nonslotted closure portions between the trailing ends of the orifice slots and the adjacent open ends of the bore. The closure portions are adapted to close off the flow ports in the flowway-closing position of the control element. In the flowway-open position of the control element, the opposite ends of the bore are in full register with the receptacle's flow ports. The silencing chamber is provided with silencing means which produce a substantial silencing effect only when the flowway is throttled by the slots in the body of the control element. Conversely, the fluid flow through the flowway is substantially unhindered when the axis of the control element's bore is coaxial with the axis of the receptacle's flowway.

In the preferred embodiments of the invention, the control element has the shape of a sphere. The silencing means can include balls. The balls can be in the chamber and/or in the slots.

Since the control element assumes a through-conduit, full-bore when the valve is in its fully opened position, there is practically no pressure drop across the control element and, therefore, the valve is practically noiseless when it is in its fully opened position. The silencing means can include means other than balls, for example, it can include ribs which are angularly spaced apart. The ribs define openings therebetween that cause a non-circuitous, multipath, fluid flow pattern between the ribs. Additionally, perforations between the control element's bore and the silencing chamber can enhance the silencing effect when the axis of the bore is not coaxial with the axis of the flowway. The perforations allow discrete fluid jets to flow from the bore into the silencing chamber and thence into the throttling orifice slots of the control element. In certain embodiments of the invention, the orifice slots are in direct communication with the silencing chamber. In another embodiment, the throttling orifice slots communicate with the chamber through a slotted wall.

BRIEF DESCRIPTION OF THE DRAWINGS

FIG. 5 is a plan view looking into the open end of the bore in the control element, and of a slot associated therewith and extending therefrom;

FIG. 6 is an enlarged sectional detail view showing a portion of (1) the perforations in the wall of the axial bore in the control element, (2) the silencing chamber surrounding the wall of the axial bore, and (3) the associated throttling orifice slot; the chamber and slot being filled with silencing spherical balls retained therein by transverse pins;

FIG. 7 is a view on line 7—7 of FIG. 6;

FIG. 8 shows an alternate shape for the silencing balls used to fill the chamber and the orifice slots in the embodiment shown in FIG. 6;

FIG. 14 is a view of the spherical element prior to receiving a silencing spool; FIG. 15 shows an embodiment of such a perforated silencing spool; FIG. 16 is a view of the spherical element after the silencing spool has been forcibly inserted into the bore of the spherical element and the outer walls of the spool's flanges have been shaped to match the outer surface of the element;

DETAILED DESCRIPTION OF THE PREFERRED EMBODIMENTS

Figure 1:
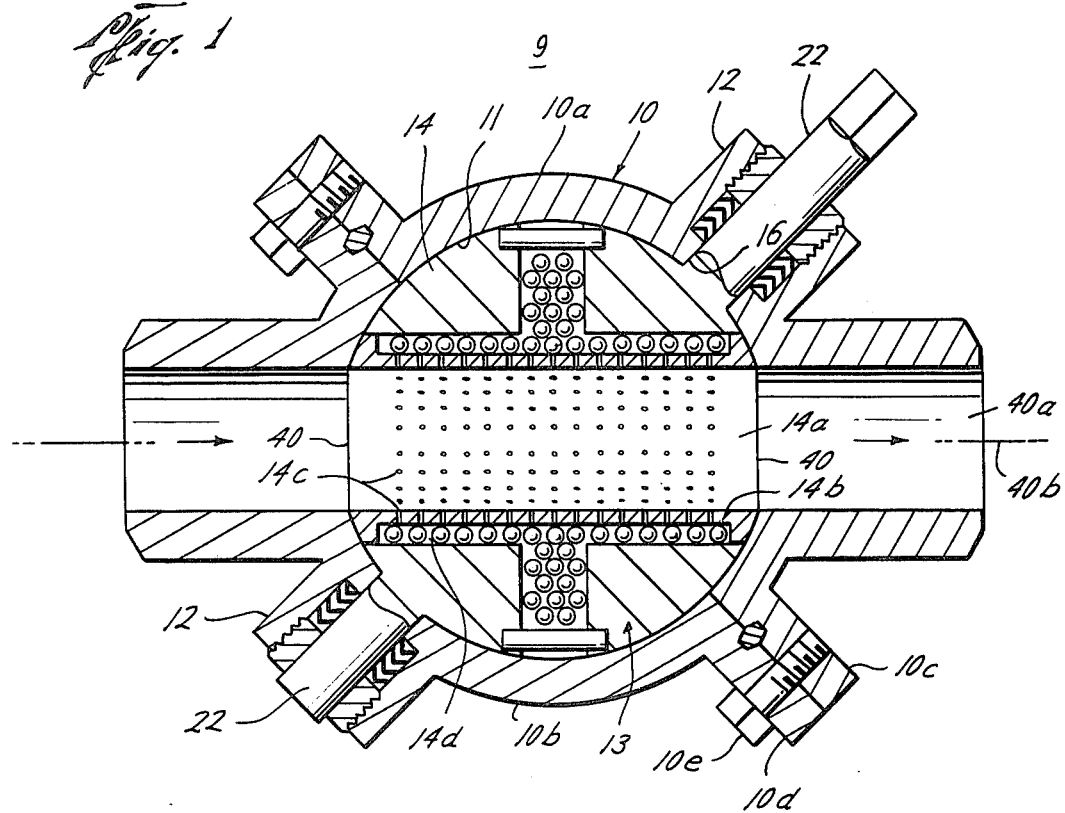
FIG. 1 is a vertical, sectional view of a rotary control valve having a flow-control spherical element incorporating the noise-attenuating means in accordance with one embodiment of the invention, the sphere having an axial cylindrical bore shown in the valve's fully-opened position and a pair of spiral, converging throttling orifice slots.

To facilitate the description, the same numerals will be used thoughout the drawings to designate the same parts. Similar parts are sometimes designated with the same numerals followed by a (') prime.

Referring first to the embodiment of the valve illustrated in FIGS. 1-9, the low-noise rotary control valve, generally designated as 9, includes a hollow casing 10 constructed of two semi-spherical parts 10a and 10b carrying annular mating flanges 10c and 10d, respectively, which are adapted to be connected together by any conventional fastening means such as bolts 10e. Casing 10 defines a generally-spherical, internal receptacle 11 communicating with coaxially-registering circular inlet and outlet flow ports 40—40 on diametrically-opposite sides of casing 10. Ports 40—40 define therebetween a flowway 40a having a longitudinal axis 40b.

Figure 2:
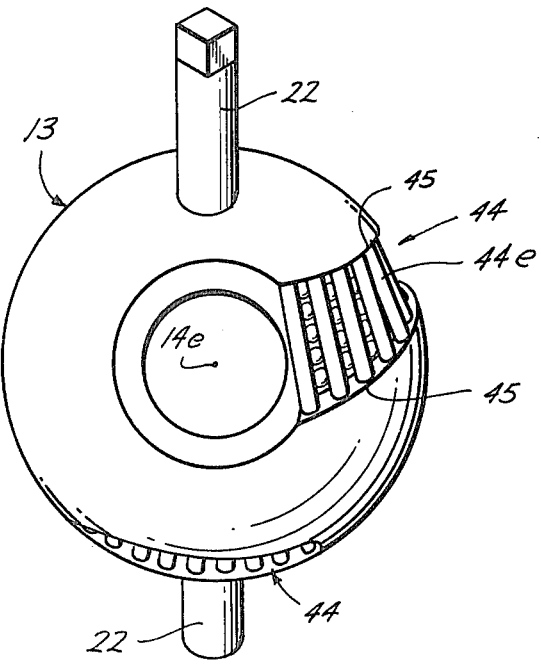
FIG. 2 is a view in perspective of the spherical control element shown in FIG. 1.

A fluid flow control element, designated generally as 13, comprises a sphere 14 having an axial bore 14a forming a constant-area orifice therethrough. Bore 14a has a longitudinal center axis 14e (FIG. 2). The bore's wall 14b has a multiplicity of angularly-spaced, radially-extending perforations 14c. An outer cylindrical chamber 14d completely surrounds wall 14b and fluidly communicates with bore 14a through the radial perforations 14c.

The cross-sectional area of the control element's bore 14a is substantially equal to the cross-sectional area of each one of flow ports 40—40. Sphere 14 is rotatably mounted inside receptacle 11 to vary the valve's effective orifice area. When sphere 14 is rotated to its fully-open position (FIG. 1), the open opposite ends of bore 14a become in registration with the circular flow ports 40—40, and the longitudinal axis 14e (FIG. 2) of bore 14a will become coincident with the axis 40b of the flowway 40a through the valve's casing 10. In its non-throttling, fully open position, valve 9 offers a through conduit, full-bore. Fluid flowing through valve 9, when it is in its non-throttling position, sustains practically no pressure drop, which is a very important advantage of the present invention.

A pair of generally-triangular orifice slots 44 (FIG. 2) in the body of sphere 14 extend generally-circumferentially and in opposite directions from the opposite open ends of bore 14a. Each orifice slot 44 is formed by a pair of walls 45 which are inclined inwardly at an acute angle to the axis 14e of bore 14a and converge to form a trailing end 46 (FIG. 5). The remaining non-slotted areas of sphere 14 lying in back of and around trailing ends 46 define closure portions 47 (FIG. 9) which seal, in the flowway-closing position of sphere 14, against a pair of conventional seals 47a inside flow ports 40—40.

Sphere 14 is provided with a pair of oppositely-extending, coaxial, cylindrical trunnions 22—22 (FIG. 3), either one of which may be the rotating stem. Trunnions 22—22 are suitably mounted in coaxial openings 16—16, at diametrically-opposite points on sphere 14, and project outwardly from sphere 14 through coaxial tubular bosses 12—12 at diametrically-opposite points on casing 10.

The coincident axes of trunnions 22 and bosses 12 define an axis of rotation 16a for sphere 14. Axis 16a is coincident with the main axis 11a of receptacle 11. Main axis 11a is disposed at an acute angle to the longitudinal axis 14e (FIG. 2) of bore 14a. This acute angle also corresponds to the angle between the flowway axis 40b (FIG. 1) and the main axis 11a of receptacle 11.

In a plan development (FIG. 5), each slot 44 has an elongated, generally-triangular configuration. In general, the angular lengths of both orifice slots 44 are equal and can be less or greater than 90°. These angular lengths have a range preferably from about 180° to about 270° or more. Such an extended angular length for each slot 44 will permit rotation of sphere 14 through an angle of up to about 270° or more, between its fully-closed and fully-opened positions, thereby providing an extended range of variation in the valve's effective orifice area through the sphere 14 for gradually and accurately throttling the flow of fluid through the flowway 40a of valve 9.

In the embodiment of the valve shown in FIGS. 1-9, the sphere's cylindrical chamber 14d and each orifice slot 44 is filled with suitably-dimensioned balls 44a (FIG. 6) which are retained therein by transverse pins 44e, as shown.

When valve 9 is fully opened, as shown in FIG. 1, bore 14a will allow the total fluid from flowway 40a to flow through, with the fluid filling and pressurizing chamber 14d (FIG. 1) and slots 44 through the perforations 14c. Since bore 14a has the same cross-sectional area as each of parts 40—40, the fluid flow through bore 14a will encounter a negligible pressure drop and, therefore, no appreciable noise will be generated by the fluid flowing through the valve 9.

In the fully-closed position of the valve (FIG. 9), the sphere's closure portions 47 will cover the flow ports 40—40 and no flow of fluid will take place through the body of sphere 14.

Figure 3:
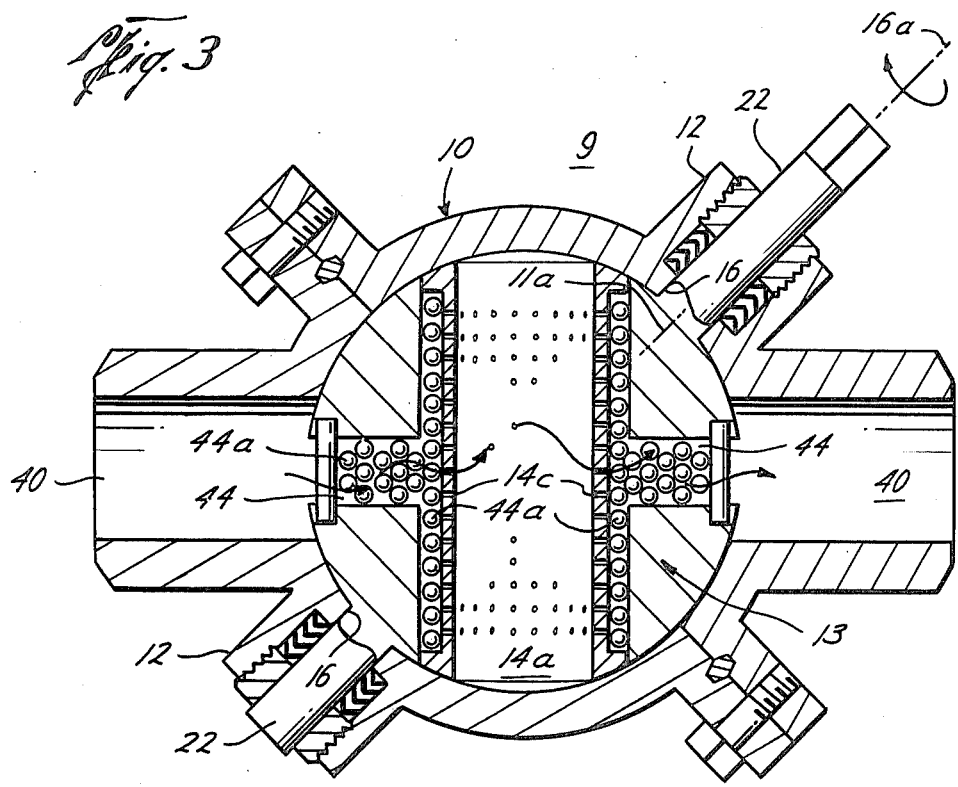
FIG. 3 is a view similar to FIG. 1 but showing the spherical control element in its throttling, partly-open position, with only the throttling slots facing their related inlet and outlet ports of the valve.
Figure 4:
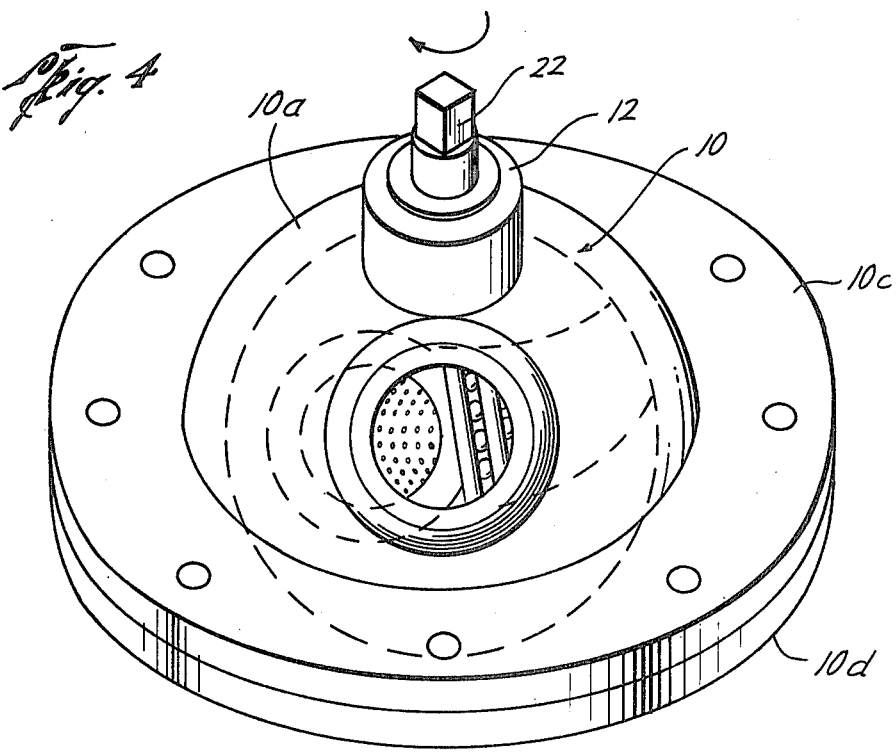
FIG. 4 is an end view of the valve shown in FIG. 1, but with the control element in a position just starting to close.
Figure 9:
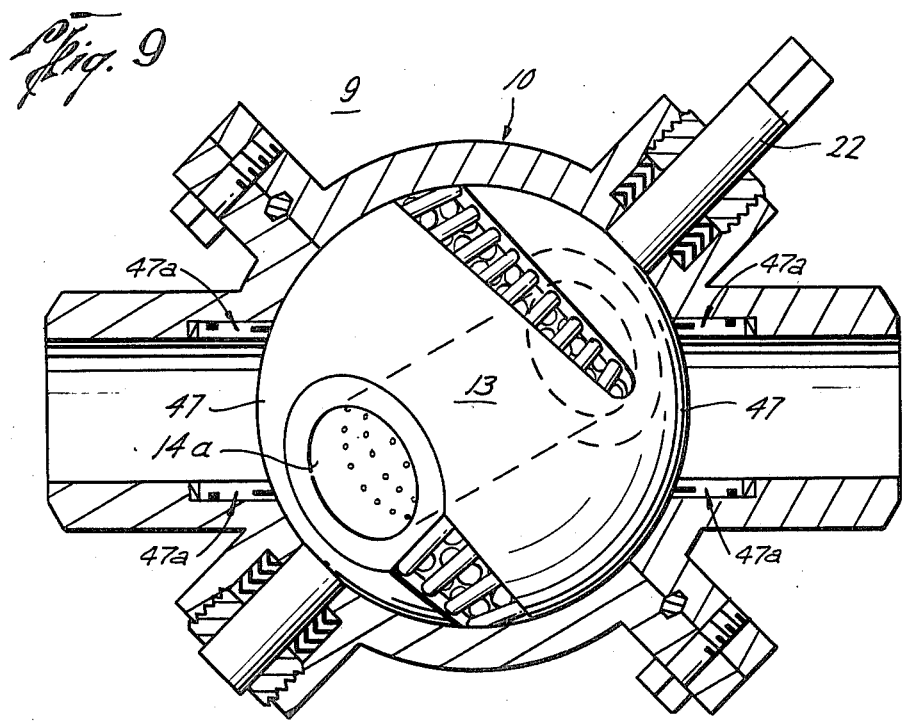
FIG. 9 is a vertical, partly sectional view of the valve showing the spherical element in its fully-closed position.

At any other partially-open position of valve 11, between its fully-opened and fully-closed positions, at least a part of the fluid will flow through the portions of the orifice slots 44 which are exposed to ports 40—40 (FIG. 3). In some positions of the sphere, as shown in FIG. 4, the fluid will flow partly through bore 14a and partly through the exposed portions of orifice slots 44.

Moreover, in any partially-open position of the valve, the balls 44a (FIG. 3) in chamber 14d and in the orifice slots 44 will cause the fluid flowing therethrough to have a convoluted multi-path instead of a straight path. Thus, the fluid will flow from inlet port 40 into a related orifice slot 44 and from there into chamber 14d. A portion of the fluid will flow through perforations 14c while the remainder portion will flow through chamber 14d. Both fluid portions will recombine and exit through the diametrically-opposite slots 44 facing the diametrically-opposite outlet port 40. The fluid's paths are schematically represented by the arrows.

Accordingly, balls 44a and perforations 14c create a high pressure drop in the sphere's throttling positions, thereby appreciably reducing the noise which would otherwise be generated by the valve when its sphere 14 is rotated to its throttling, partially-open positions. The balls 44a can be spherical (FIG. 1) or non-spherical balls 44'a (FIG. 8) can also be employed.

Figure 10:
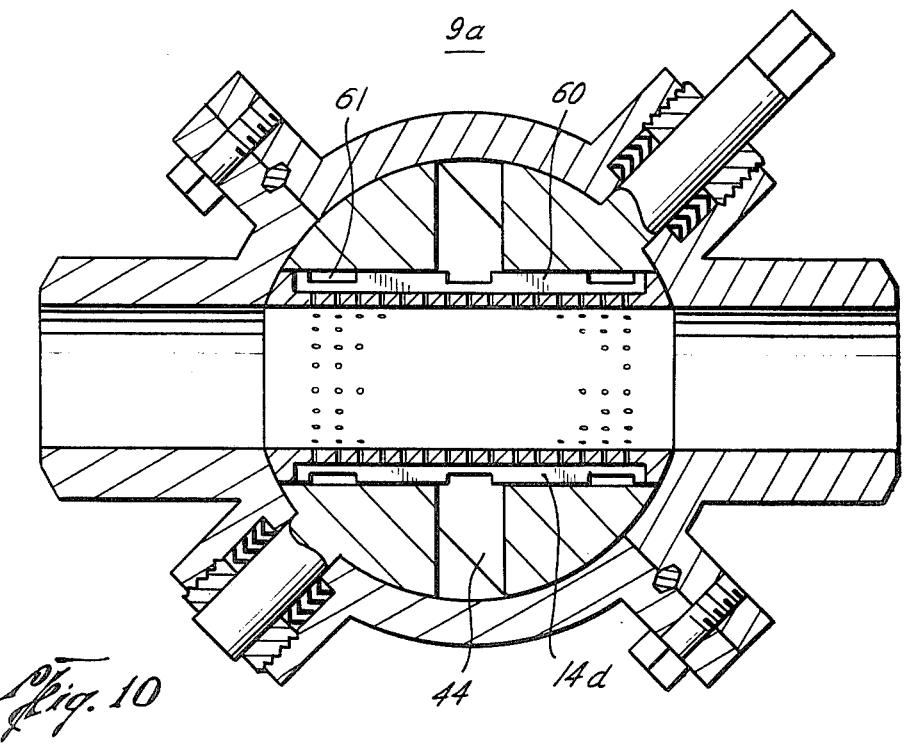
FIG. 10 is a vertical, sectional view of another embodiment of the spherical control element incorporating noise-attenuating ribs instead of balls, the valve being shown in its fully-opened position and the wall of the axial bore being perforated, allowing the bore to communicate with the surrounding silencing chamber.
Figure 11:
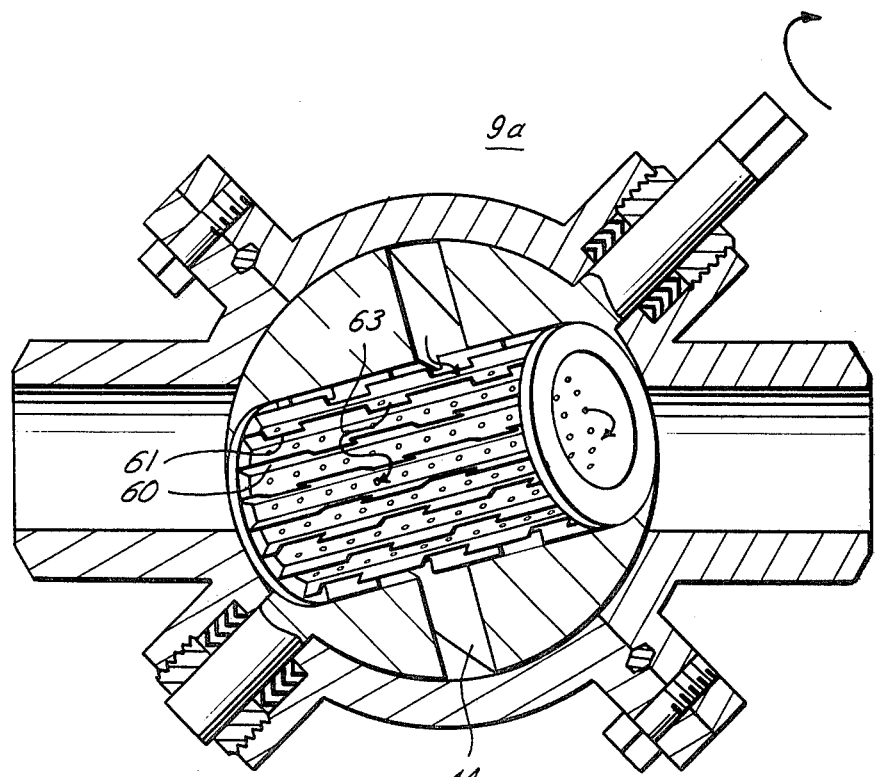
FIG. 11 is a view similar to FIG. 10 but with the spherical element in a position just starting to close; the ribs are shown in perspective.

In the embodiment of the control valve 9a shown in FIGS. 10 and 11, which is similar in most respects to the valve embodiment shown in FIG. 1, the space of chamber 14d is divided by a plurality of angularly-spaced, radially-and-longitudinally extending ribs 60, each having one or more openings 61 therein. Openings 61 are staggered to establish a non-circuitous, convoluted fluid flow pattern between ribs 60, as represented by the arrows 63.

Although not shown in FIGS. 10 and 11, the orifice slots 44 can also be filled with balls 44a to obtain an additional silencing effect. In all other major respects, the embodiment shown in FIGS. 10 and 11 is similar to that shown in FIG. 1.

Figure 12:
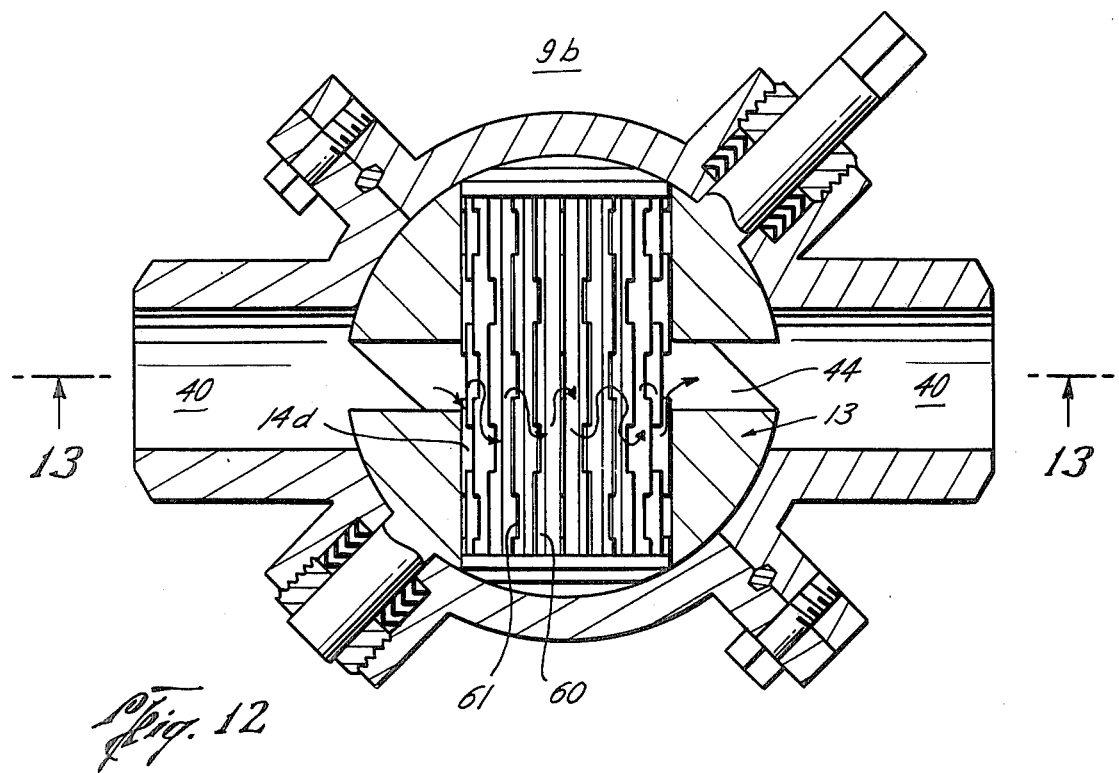
FIG. 12 shows a modification of the valve of FIG. 10 with the spherical element being in its partly-open position, and the wall of its axial bore having no perforations therethrough.
Figure 13:
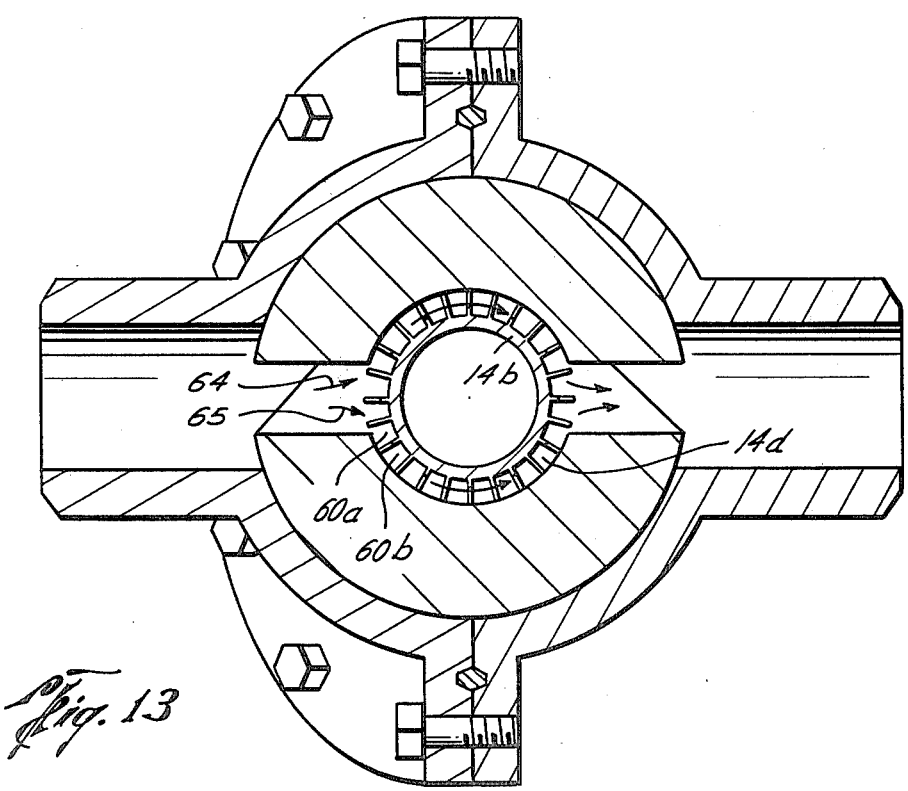
FIG. 13 is a view on line 13—13 of FIG. 12.

In the embodiment of the control valve 9b shown in FIGS. 12–13, the wall 14b of bore 14a is solid without perforations, otherwise the structure is similar to that described in connection with the embodiment shown in FIGS. 10 and 11. It will be noted that in the valve embodiment 9b of FIGS. 12–13, that when only the orifice slots 44 are opposite to ports 40—40, fluid can flow from one orifice slot 44 to the diametrically-opposite orifice slot 44 only between the ribs' openings 61 through chamber 14d, as illustrated by the arrows 64 and 65.

Thus, in the valve embodiments 9a and 9b wherein the body of sphere 14 is provided with ribs 60, by proper juxtaposition of the ribs' openings 61, a non-circuitous flow pattern can be established from a first chamber 60a, defined between an adjacent pair of ribs, to a second such chamber 60b, from the second such chamber to another such chamber, and continuing circumferentially in this manner across the stack of ribs 60 in non-circuitous and in axial convoluted paths.

Figure 14:
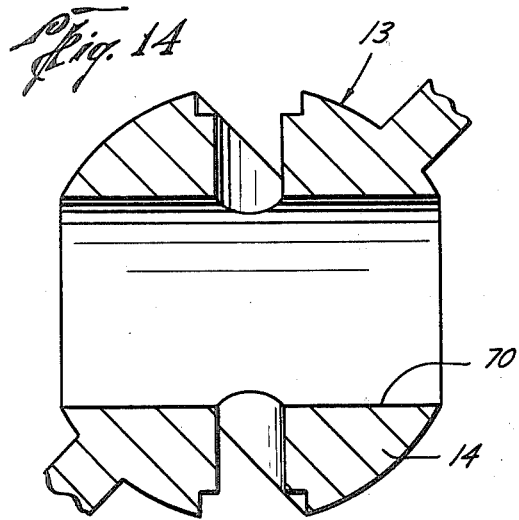
FIGS. 14-16 illustrate a method of manufacturing the spherical element for use with silencing means, above described.
Figure 15:
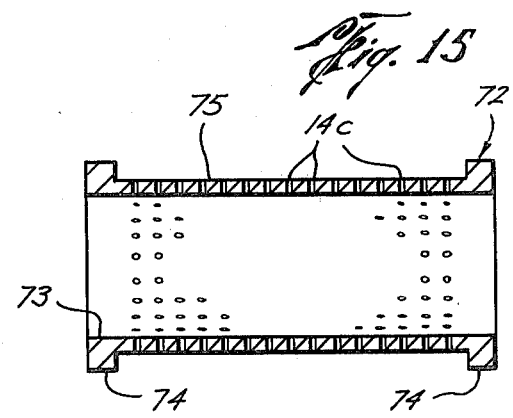
Figure 16:
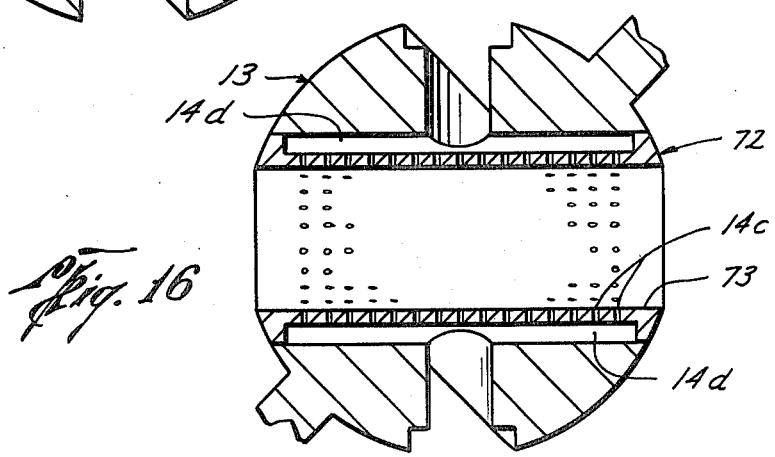

FIGS. 14–16 show a preferred method of constructing control element 13. In sphere 14 is drilled an axial bore 70 whose longitudinal axis is coincident with a diameter of sphere 14. A hollow tube 75 having a pair of annular end flanges 74—74 forms a spool, generally designated as 72. The wall of tube 75 forms a bore 73 and has a multiplicity of perforations 14c. The outer diameter of flanges 74 is slightly larger than the inner diameter of bore 70 to provide an interference fit when spool 72 is forcibly inserted into bore 70. Thereafter, the outer faces of flanges 74 are shaped to the configuration of sphere 14 so that the flanges will not interfere with the sphere's rotation inside the receptacle 11 (FIG. 1). The open space between the outer cylindrical wall of tube 75 and the cylindrical wall of bore 70 forms the desired chamber 14d within which can be installed the silencing means (balls or ribs), as previously described.

For the valve embodiments 9a and 9b shown in FIGS. 10–11 and 12–13, respectively, the ribs 60 can be cast on or welded to the outer cylindrical wall of tube 75.

The ribs 60 on the spool 72 or the balls 44a divide the fluid flow into a multi-path, convoluted fluid flow pattern in chamber 14d. Fluid flow can also take place between bore 14a and chamber 14d through the perforations 14c, when provided, which causes the fluid to be broken up into discrete jets. The ribs 60 or the balls 44a and the perforations 14c, each provides a noise-attenuating effect on the fluid as it is being throttled through the fluid flow control member 13 of the valve.

Figure 17:
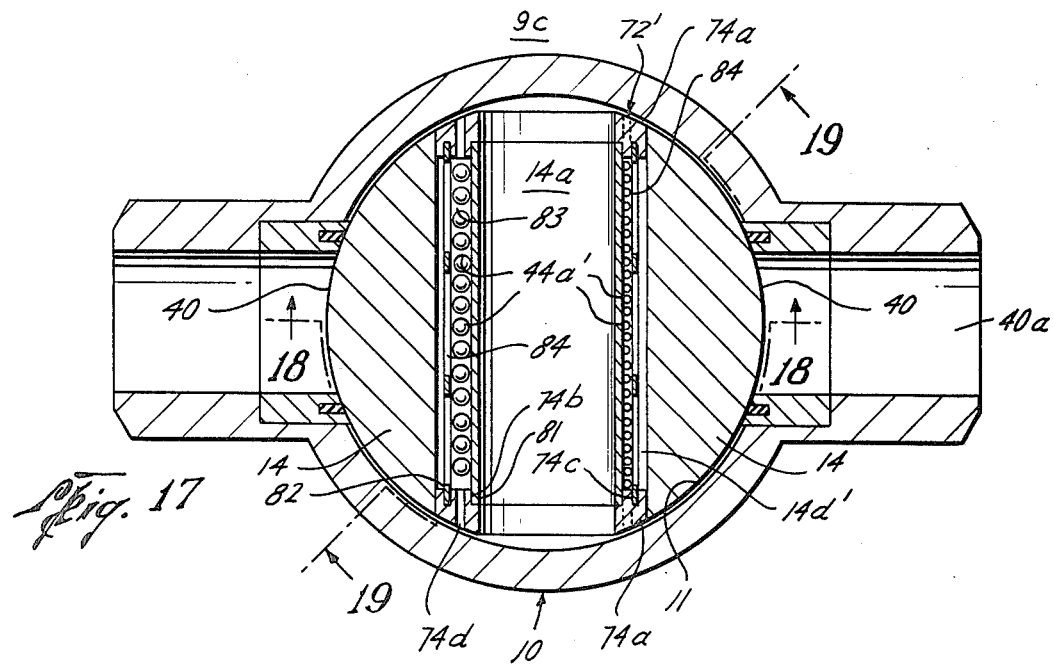
FIG. 17 is a vertical, sectional view of another embodiment of the valve wherein the silencing spool is shown as defining a chamber filled with balls, the chamber being formed between a pair of non-concentric tubular sleeves, and the valve being shown in its fully-closed position.
Figures 18, 19:
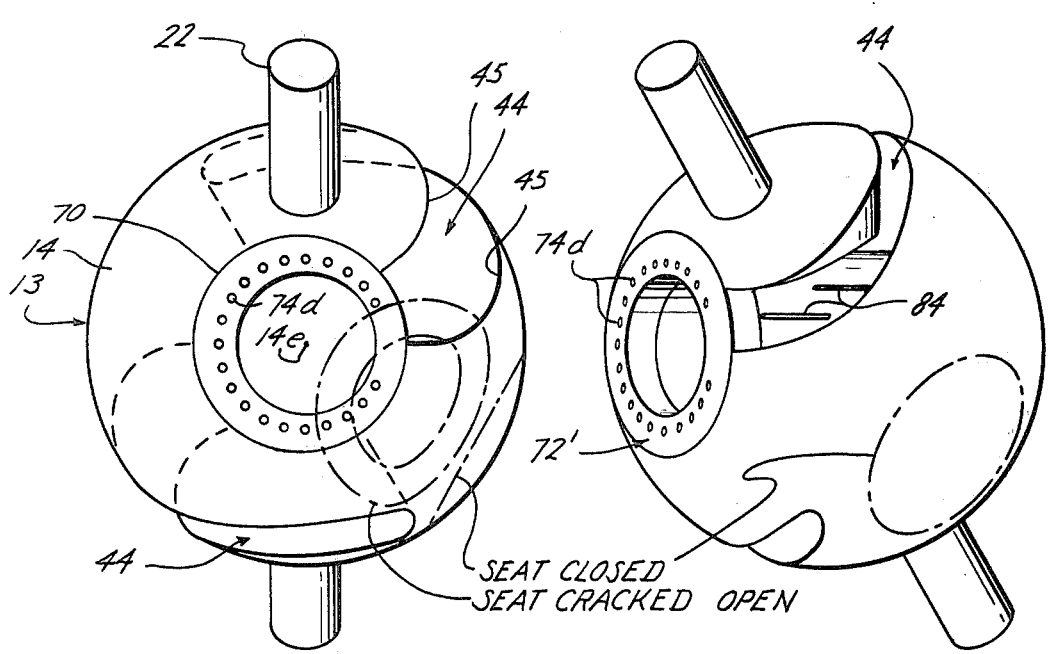
FIG. 18 is a perspective view of the spherical control element taken on line 18—18 of FIG. 17.
FIG. 19 is another view of the control element, in a different angular position from that shown in FIG. 18, taken on line 19—19 of FIG. 17.

In the embodiment of the control valve 9c shown in FIGS. 17–19, a hollow spool, generally designated as 72', is formed using a pair of eccentric, spaced-apart tubes 81, 82 forming a chamber 83 therebetween. The width dimension of chamber 83 gradually increases from a minimum to a maximum depending on the eccentricity between tubes 81 and 82. Spool 72' has an axial bore 14a. The wall of the outer tube 82 has a plurality of suitably arranged slots 84 (FIG. 19) extending therethrough. Slots 84 are preferably elongated, narrow, longitudinally-extending and angularly staggered. The inner tube 81 could be perforated but in the embodiment 9c it is solid. Tubes 81, 82 are held together in eccentric spaced relation by end flanges 74a which have inwardly and axially-extending shoulders 74b, 74c of different thicknesses. Flanges 74a have axial holes 74d therein.

The construction of sphere 14 is similar to that described in connection with FIGS. 14–16. First is drilled an axial bore 70 whose axis is coincident with a diameter of sphere 14. The outer diameter of flanges 74a is slightly larger than the inner diameter of bore 70 to provide an interference fit when spool 72' is forcibly inserted into bore 70. Thereafter, the outer faces of flanges 74a are shaped to the configuration of sphere 14 so that these flanges will not interfere with the sphere's rotation inside the receptacle 11 (FIG. 1). The open space, between the outer tube 82 of spool 72' and the cylindrical wall of bore 70, defines a chamber 14d' whose function was previously described.

Chamber 83 is filled with variable-diameter balls 44a' which are retained therein by the opposite cylindrical walls of tubes 81–82 (FIG. 17).

In the embodiment of the rotary control valve 9c, when the control element 13 is in its partially-open position so that no portion of bore 14a is opposite to the inlet and outlet ports 40—40, and only the orifice slots 44 are opposite to the ports 40—40, then fluid will flow from the inlet port 40 into the opposite orifice slot 44 and then into chamber 14d'. From chamber 14d' the fluid will flow into chamber 83 through the slots 84. The balls 44a' in chamber 83 cause the fluid flowing therethrough to have a convoluted multi-path instead of a straight path. A portion of the fluid will flow out from chamber 83 through the diametrically-opposite slot 44. From this slot 44 the fluid will flow into the diametrically-opposite outlet port 40. A portion of the fluid from chamber 83 will also flow out through the small holes 74d. In the fully-closed position, as shown in FIG. 17, the sphere 14 will be sealed off from inlet and outlet ports 40—40 by conventional seals 40g.

Accordingly, balls 44a' and holes 74d appreciably reduce the noise which would otherwise be generated by the valve when its sphere 14 is rotated to its throttling, partially-open positions. When the two tubes 81, 82 of spool 72' are eccentrically mounted, as shown in FIG. 17, the noise reduction provided by the valve is greater than if the tubes were concentrically mounted (not shown).

Again, as in the previous embodiments of the rotary valve, the silencing means do not interfere with the free flow of fluid through the fluid flow control element 13 when it is in its fully-open position.

What I claim is:

1. In a rotary control valve comprising:
   (a) a casing defining a receptacle having a main axis and having flow ports communicating with said receptacle at spaced points to define a flowway therethrough disposed at an acute angle to said main axis;
   (b) a flow-control member rotatably disposed within said receptacle, said member comprising:
      (1) a body shaped to fit said receptacle and having an axis of rotation coaxial with said main axis;
      (2) said body defining an axial bore having an axis generally at said acute angle with respect to said axis of rotation, and said bore opening through the outer wall of said body, whereby the opposite open ends of the bore will be in register with said flow ports at the fully-open position of said control member;
      (3) a pair of elongated orifice slots through the wall of said body extending circumferentially of the body in opposite directions generally from the opposite open ends of said bore, each of said slots being defined by walls converging toward their trailing ends;
      (4) said body having nonslotted closure portions between the trailing ends of said orifice slots and the adjacent ends of said bore, said closure portions being adapted to close off said flow ports in the flowway-closing position of said control member, the improvement wherein:
      (5) said orifice slots include silencing means causing a tortuous flow in the valve's throttling positions, said flow becoming substantially straight when the full bore is in register with said flow ports.

2. A rotary control valve comprising:
   (a) a casing defining a receptacle having a main axis and having flow ports communicating with said receptacle at spaced points to define a flowway therethrough disposed at an acute angle to said main axis;
   (b) a flow-control member rotatably disposed within said receptacle, said member comprising:
      (1) a body shaped to fit said receptacle and having an axis of rotation coaxial with said main axis;
      (2) said body defining an axial bore having an axis generally at said acute angle with respect to said axis of rotation, and said bore opening through the outer wall of said body, whereby the opposite open ends of the bore will be in register with said flow ports at the fully-open position of said control member, and a chamber in said body surrounding said bore;
      (3) a pair of elongated orifice slots through the wall of said body extending circumferentially of the body in opposite directions generally from the opposite open ends of said bore, each of said slots being defined by walls converging toward their trailing ends;
      (4) said body having nonslotted closure portions between the trailing ends of said orifice slots and the adjacent ends of said bore, said closure portions being adapted to close off said flow ports in the flowway-closing position of said control member;
      (5) said orifice slots and said bore cooperating with the related flow ports to provide a variable-area orifice depending on the angular positions of said flow-control member; and
      (6) silencing means in said chamber producing a noise-attenuating effect on fluid flowing through said valve.

3. The valve of claim 2 wherein said silencing means include a multiplicity of balls.

4. The valve of claim 3 wherein said balls also fill said orifice slots.

5. The valve of claim 2 wherein said silencing means include a plurality of angularly-spaced, radially and longitudinally extending ribs.

6. The valve of claim 5 wherein each rib has one or more openings therein which are staggered to establish a convoluted, multi-path, fluid flow pattern between the ribs.

7. The valve of claim 3, and a plurality of perforations in fluid communication between said bore and said chamber.

8. The valve of claim 5, and a plurality of perforations in fluid communication between said bore and said chamber.

9. In a rotary control valve comprising:
   (a) a casing defining a receptacle having a main axis and having flow ports communicating with said receptacle at spaced points to define a flowway therethrough;
   (b) a flow-control member rotatably disposed within said receptacle, said member comprising:
      (1) a body shaped to fit said receptacle;
      (2) said body defining an axial bore opening through the outer wall of said body, whereby the opposite open ends of the bore will be in register with said flow ports at the fully-open position of said control member;
      (3) a pair of elongated orifice slots through the wall of said body extending circumferentially of the body in opposite directions generally from the opposite open ends of the wall of said bore, each of said slots being defined by walls converging toward their trailing ends;
      (4) said body having nonslotted closure portions between the trailing ends of said orifice slots and the adjacent ends of said bore, said closure portions being adapted to close off said flow ports in the flowway-closing position of said control member, the improvements wherein:
      (5) said body having a silencing chamber surrounding the wall of said bore, and silencing means in said silencing chamber.

10. The valve of claim 9 wherein said silencing means produce a silencing effect on fluid flowing through said flowway only when the flowway is throttled by said orifice slots.

11. The valve of claim 9 wherein said silencing means include a multiplicity of balls.

12. The valve of claim 9, and a spool having an inner tube and an outer tube forming therebetween said silencing chamber, the wall of said outer tube having a plurality of slots.

13. The valve of claim 12 wherein the wall of said inner tube is unperforated.

14. The valve of claim 12 wherein said tubes are eccentrically mounted and said silencing means are balls of different diameters.

15. The valve of claim 9 wherein the fluid flow through said flowway is unhindered when the flowway is not throttled by said orifice slots.

* * * * *